M. WYKA.
INK WELL.
APPLICATION FILED SEPT. 8, 1916.

1,300,322.

Patented Apr. 15, 1919.

Witness:
E. M. Schweiger.

Martin Wyka, Inventor.
By Emil Neuhart
Attorney.

UNITED STATES PATENT OFFICE.

MARTIN WYKA, OF BUFFALO, NEW YORK.

INK-WELL.

1,300,322. Specification of Letters Patent. Patented Apr. 15, 1919.

Application filed September 8, 1916. Serial No. 119,019.

*To all whom it may concern:*

Be it known that I, MARTIN WYKA, a subject of the Emperor of Austria, residing at Buffalo, in the county of Erie and State of New York, have invented certain new and useful Improvements in Ink-Wells, of which the following is a specification.

My invention relates to improvements in ink wells, and more particularly to an ink well of the non-spilling type.

The invention has for its object the production of a simple and inexpensive non-spilling ink well which can be used in a plurality of ways, the well being of cubical shape and any one of a plurality of sides thereof being adapted to serve as the bottom of the well.

Another object of my invention is to so construct a well that the pen opening is positioned to permit insertion of the pen into the well without changing the position of the pen held by the hand, thus rendering the well exceedingly convenient and making it possible to more easily control the amount of ink taken up by the pen.

Another object is to provide a well of this type which can be constructed from a single piece of material, preferably vitreous material, formed in cubical shape so as to present an even-sided well of neat eppearance.

A further object of my invention is to provide a cubical ink well having its pen opening at one of the angles or corners of the well and a tube extending inwardly from said angle or corner toward the diagonally-opposite angle or corner.

With these and other objects in view the invention consists in the novel construction of parts to be hereinafter more fully described and particularly pointed out in the subjoined claim.

In the accompanying drawing,—

Figure 1:
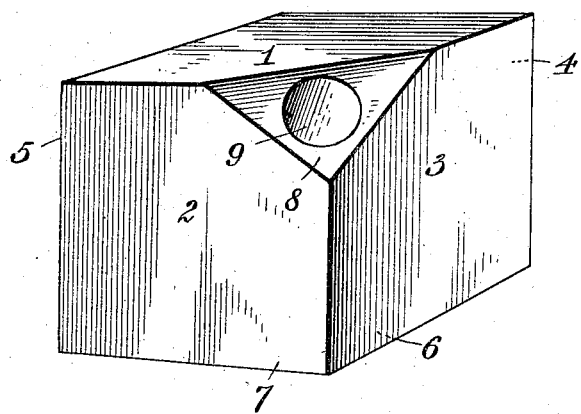

Figure 1 is a perspective view of the ink well.

Figure 2:
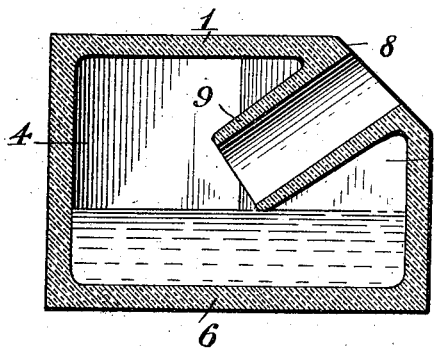
Figure 3:
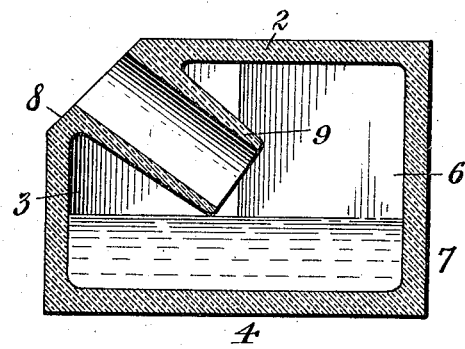
Figure 4:
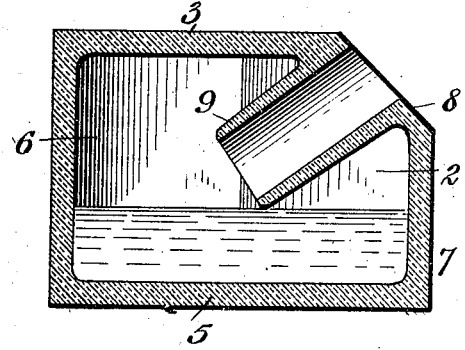

Figs. 2, 3, and 4 are vertical sections taken diagonally through the ink well, different sides of the well being used as the bottom of the ink well in the three figures.

Figure 5:
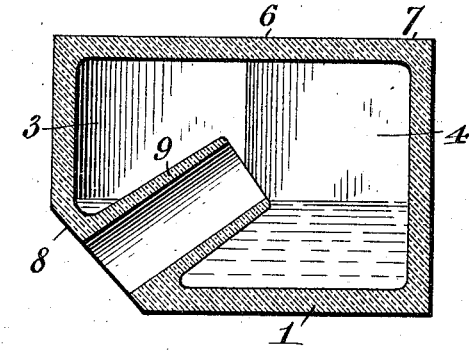

Fig. 5 is a similar view of the ink well in inverted position.

Like numerals of reference indicate the same parts throughout the several figures, in which the numeral 7 designates the body of the ink well which is of cubical shape and preferably made of vitreous material. This cubically-shaped body has its six sides or surfaces designated by the reference numerals 1 to 6 respectively, and one of the corners of said body is cut away to provide a triangular or other flat surface 8 which cuts away portions of three adjoining sides or surfaces, for instance as shown in the drawings, a portion of each of the sides or surfaces 1, 2 and 3.

Extending inwardly from said cut-away portion or corner is a tube 9, the axis of which is directed to the diagonally-opposite corner, said tube being formed integrally with the body portion and the interior thereof serving as a pen opening. This tube may extend any desired distance into the interior of the body portion, but by preference is terminated at a point approximately midway between the cut-away portion or corner 8 and the corner diagonally opposite toward which it is directed. The ink in the well may be retained at a level in line with the lowest point of said tube, as shown in Figs. 2, 3, and 4.

By directing the tube from one corner to the diagonally-opposite corner of the cubically-shaped body portion 7, the tube is arranged most conveniently for inserting a pen into the ink well. With the tube thus arranged the pen when inserted into the well enters the ink at an angle to the vertical and consequently a small quantity of ink within the well will furnish the pen with ink to a greater height than when inserting a pen into the ink well in a vertical or substantially vertical position. Moreover, since it is unnecessary, by reason of this construction, to change the position of the pen when dipping the same into the well, the extent to which the pen is to be inserted into the ink may more easily be controlled.

With the pen opening arranged at one corner of the well, formed by three of the sides or surfaces thereof, the well may be used in any of three different positions and in each case the tube 9 projects downwardly into the interior of the well at the desired angle. For example, in Figs. 1 and 2 the well is shown with the side or surface 6 as the bottom of the well; in Fig. 3, the side or surface 4 serves as the bottom; and in Fig. 5, the side or surface 5 serves as the bottom of the well. When in use in either of these positions the pen opening is located with respect to the side on which the well rests, as shown in Fig. 1.

It is apparent therefore that the well when resting upon the side or surface 6 may be tipped onto its side 4 or onto its side 5 and remain in proper position for use, and when tipped into either of these positions or into any other position so that it rests upon the side or surface 1, 2 or 3, the ink cannot be spilled from the well.

When resting upon its side 1 it may be said to be in inverted position, this being shown in Fig. 5 of the drawings. The ink in this position of the well is retained therein due to the fact that the level thereof is below the lowest point of the opening or bore of the tube 9. At such times the ink is trapped around the tube; and the same conditions exist when the well is tilted so that it rests upon its side 2 or 3. These two last-mentioned positions may also be considered inverted positions of the well since the cut-away corner is at the bottom of the well in either of these two positions and the diagonally-opposite corner toward which the tube 9 is directed at the top of the well. It may therefore be said that in either of three positions the well is in upright position for use and in the remaining three positions it is in inverted position with the ink trapped around the tube 9 so that spilling of the ink well is impossible, regardless of the position in which the well may stand.

In the drawings I have represented the ink well as constructed of glass, but any other vitreous material or any material capable of properly retaining ink may be used, if desired.

Having thus described my invention, what I claim is,—

An ink well of cubical shape adapted to have any of three sides serve as its bottom and having an internal open-ended tube opening at its outer end at a corner formed by three sides of the well and being directed toward the diagonally-opposite corner formed by the remaining three sides of the well.

In testimony whereof I affix my signature.

MARTIN WYKA.